United States Patent
Misikir et al.

(10) Patent No.: US 9,598,032 B1
(45) Date of Patent: Mar. 21, 2017

(54) WHEEL ROTATION BLOCKING APPARATUS

(71) Applicant: Ford Global Technologies, LLC, Dearborn, MI (US)

(72) Inventors: Laike Misikir, Ann Arbor, MI (US); Matthew B. Makowski, Northville, MI (US); Shekar Prabhakar Erasala, Northville, MI (US); Djamal Eddine Midoun, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/959,028

(22) Filed: Dec. 4, 2015

(51) Int. Cl.
  *B60R 19/00* (2006.01)
  *B60R 21/00* (2006.01)

(52) U.S. Cl.
  CPC .............. *B60R 19/00* (2013.01); *B60R 21/00* (2013.01); *B60R 2019/002* (2013.01); *B60R 2021/0004* (2013.01)

(58) Field of Classification Search
  CPC ............ B60R 2019/002; B62D 21/152; B62D 21/155
  USPC .............. 296/187.03, 187.09, 187.1, 187.06, 296/187.11; 280/784; 180/274; 293/137, 293/119
  See application file for complete search history.

(56) References Cited

U.S. PATENT DOCUMENTS

| | | | | |
|---|---|---|---|---|
| 2,048,945 A | * | 7/1936 | Pascheka | B60R 19/40 293/117 |
| 5,101,927 A | * | 4/1992 | Murtuza | B60T 7/22 180/275 |
| 6,296,278 B1 | * | 10/2001 | Zupancic | B60R 21/13 280/753 |
| 6,460,889 B2 | | 10/2002 | Iyanagi et al. | |
| 8,033,573 B2 | * | 10/2011 | Beki | B60R 21/13 180/69.21 |
| 8,985,258 B1 | | 3/2015 | Midoun et al. | |
| 9,067,469 B2 | | 6/2015 | Asjad | |

FOREIGN PATENT DOCUMENTS

| | | |
|---|---|---|
| JP | 4293015 B2 | 4/2009 |
| JP | 4349168 B2 | 7/2009 |
| WO | 2013146495 A1 | 10/2013 |

* cited by examiner

*Primary Examiner* — Dennis H Pedder
(74) *Attorney, Agent, or Firm* — Jason C. Rogers; Brooks Kushman P.C.

(57) ABSTRACT

A tire rotation blocking apparatus is disclosed for preventing a front tire of a vehicle from moving toward a passenger compartment in a small offset rigid barrier front-end collision. In one embodiment, an elongated bar is received by a plurality of guide members that each define an aperture extending in a longitudinal direction and that are fixedly attached to the vehicle. An actuator, such as a pyrotechnic device, is operatively connected to the bar to drive the bar longitudinally between the wheel and the passenger compartment in a front-end collision. In another embodiment, the actuator includes a spring attached to the bar, or blocker, that is released to drive the bar in a forward longitudinal direction. At least one stop engages the bar to hold the bar in the blocking position between the wheel and the passenger compartment.

14 Claims, 4 Drawing Sheets

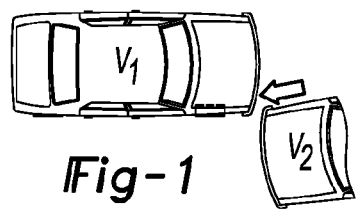
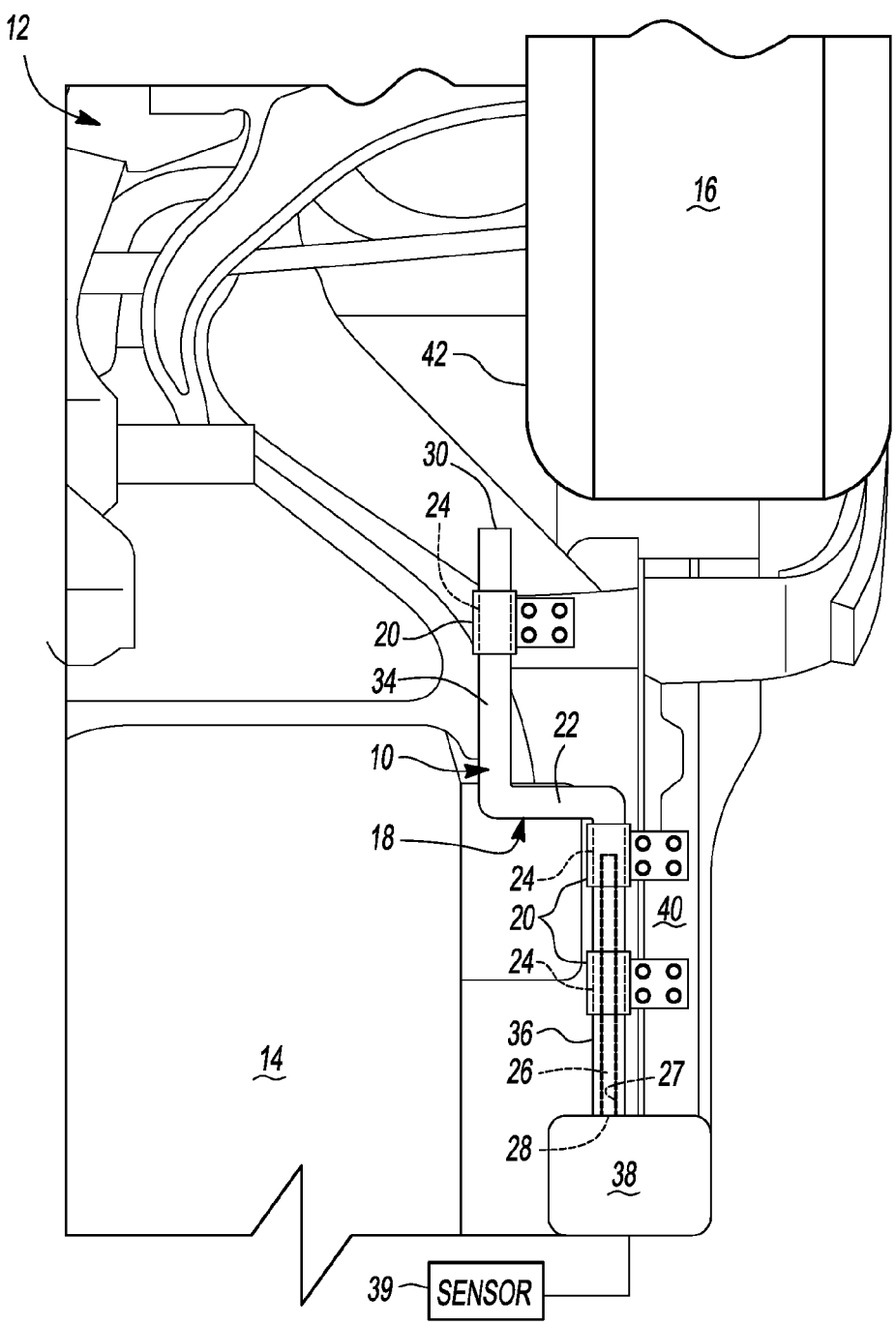
Fig-1
Fig-2

WHEEL ROTATION BLOCKING APPARATUS

TECHNICAL FIELD

This disclosure relates to an apparatus for dynamically blocking inward movement of a front vehicle wheel in a front end collision.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body.

An Insurance Institute for Highway Safety (IIHS) Small Offset Rigid Barrier (SORB) test simulates small overlap frontal crashes against a rigid barrier. In the proposed test, the vehicle impacts a rigid barrier having a six inch pole-like radius on one corner with a 40% overlap at 40 MPH. The impact is outboard of the frame rails and the frame rails provide minimal resistance to intrusion into the passenger compartment.

The front tire may be deflected inboard in a small offset impact and toward the passenger compartment because the impact is non-symmetrical in that it is applied to only one side of the vehicle. The wheel and tire assembly (hereinafter the "wheel") is secured to the vehicle to be able to pivot to make turns which makes the front wheel subject to being deflected in a collision.

These and other problems are addressed by this disclosure as summarized below.

SUMMARY

According to one aspect of this disclosure, an apparatus is disclosed for preventing a wheel of a vehicle from moving toward a passenger compartment in a front-end collision. The apparatus comprises an elongated bar received by a plurality of guide members that each define an aperture extending in a longitudinal direction and that are fixedly attached to the vehicle. An actuator is operatively connected to the bar to drive the bar in the longitudinal direction and between the wheel and the passenger compartment in a front-end collision.

According to another aspect of this disclosure, an apparatus is disclosed for protecting a passenger compartment of a vehicle from intrusion by a wheel in a front-end collision. The apparatus comprises a blocker and an actuator that is operatively connected to the blocker to move the blocker between the wheel and the passenger compartment. The blocker is longitudinally movable between a ready position behind the wheel and a deployed position between the wheel and the passenger compartment. The actuator is affixed to the vehicle and drives the blocker between the ready position and the deployed position in the front-end collision.

According to other aspects of this disclosure, the actuator may be a pyrotechnic actuator attached to a back end of the bar, or blocker. At least one stop may be provided that holds the bar, or blocker, between the wheel and the passenger compartment.

Alternatively, the actuator may be a spring attached to the bar, or blocker, that is released to drive the bar in a forward longitudinal direction. A linkage may be operatively connected to the actuator and a spring retainer that holds the spring in the ready position, wherein the actuator moves the linkage to release the spring in a collision.

The elongated bar, or blocker, may be retained by one or more guide members and may include first and second longitudinally extending legs that are connected by a transversely extending leg. A front portion of the first longitudinally extending leg may be disposed inboard of the wheel after the actuator drives the bar longitudinally. The second longitudinally extending leg may be laterally offset relative to the first longitudinally extending leg. At least one guide member may receive the first longitudinally extending leg and another guide member may receive the second longitudinally extending leg.

At least one of the guide members may be attached to a rocker assembly of the vehicle. Alternatively, the guide member may be attached to a frame rail or other part that is connected to the vehicle frame. The elongated bar may be moved by the actuator between a ready position with a front end of the bar being disposed rearward of the wheel and a deployed position with the front end of the bar being disposed adjacent an inner side of the wheel.

According to another aspect of this disclosure, an apparatus is disclosed for blocking a wheel from intruding into a passenger compartment of a vehicle. The apparatus comprises a wheel blocker attached to the vehicle that includes a guide for guiding forward movement of the wheel blocker between a ready position and a deployed position. An actuator is operatively connected to the wheel blocker to drive the wheel blocker from the ready position to the deployed position in a front end collision.

The apparatus may further comprise a stop that retains the wheel blocker in the deployed position after the actuator drives the wheel blocker to the deployed position in the collision.

The above aspects and other aspects of this disclosure are described below in greater detail with reference to the attached drawings.

BRIEF DESCRIPTION OF THE DRAWINGS

FIG. 1 is a top plan view of a vehicle just before a collision with another vehicle that is partially illustrated.

FIG. 2 is a fragmentary bottom plan view of a tire rotation blocking apparatus attached to a vehicle in the ready position.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a vehicle $V_1$ is shown just prior to a small offset collision with an oncoming vehicle $V_2$. A directional arrow represents the impact force.

Figure 3:
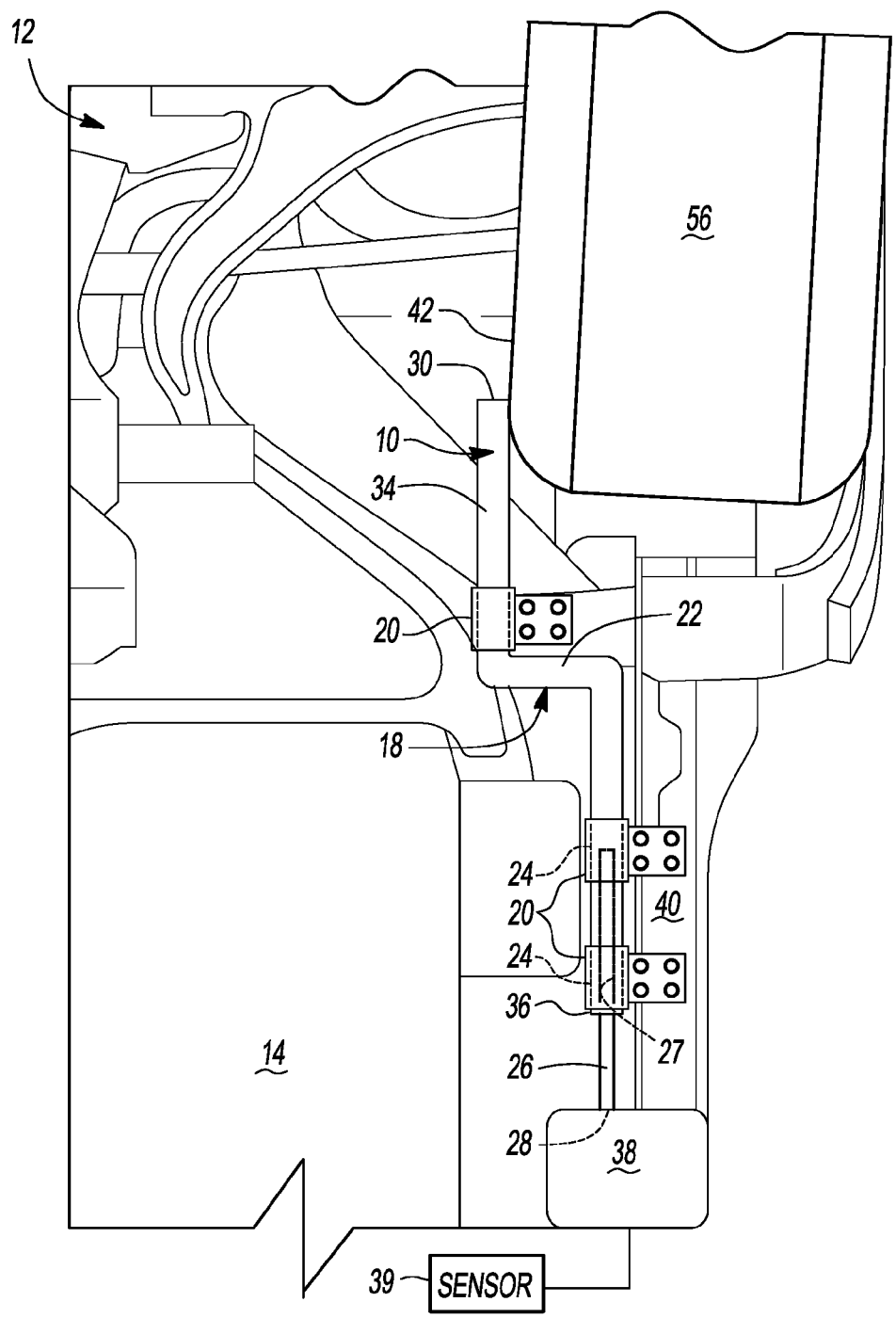
FIG. 3 is a fragmentary bottom plan view of the tire rotation blocking apparatus shown in FIG. 2 in the deployed position.

Referring to FIGS. 2 and 3, a wheel rotation blocking apparatus is generally indicated by reference numeral 10. The wheel rotation blocking apparatus 10 is assembled to a vehicle 12 to protect a passenger compartment 14 (i.e., the front toe pan area) from intrusion by a wheel assembly 16. The wheel assembly 16, as referred to herein, includes both the tire and wheel.

A blocking bar 18 is part of the wheel rotation blocking apparatus 10. The blocking bar 18 is secured to the vehicle 12 by a plurality of guide members 20 that are fixedly attached to the vehicle 12. The blocking bar 18 includes a transverse portion 22 that stops the movement of the blocking bar 18 when it is in position between the passenger compartment 14 and the wheel assembly 16. The guide members 20 each define an aperture 24 that has a central axis extending in the longitudinal vehicle direction. A guide pin 26 may also be provided that is received in a guide opening 27, or slot, defined in a back end 28 of the blocking bar to provide additional guidance for the movement of the blocking bar 18.

The blocking bar 18 includes the back end 28 and a front end 30, or front portion. The lateral offset portion 22 of the blocking bar 18 extends in the transverse vehicle direction between a front leg 34, or first longitudinally extending portion, and a rear leg 36, or second longitudinally extending portion.

An actuator 38 is operatively connected to the back end 28 of the blocking bar 18. The actuator 38, as shown in FIGS. 1 and 2, is a pyrotechnic actuator that receives a signal from a crash sensor 39 and is discharged using an explosive or gaseous discharge that is focused and applied to the back end 28 of the blocking bar 18 to drive or thrust the blocking bar 18 in a forward vehicle direction between the passenger compartment 14 and wheel assembly 16. The actuator 38 and the guide members 20 may be attached to the rocker assembly 40. The wheel assembly 16 has an inner side 42 that is engaged by the blocking bar 18 when the blocking bar is moved from its ready position, as shown in FIG. 2, to its deployed position, shown in FIG. 3.

Figure 4:
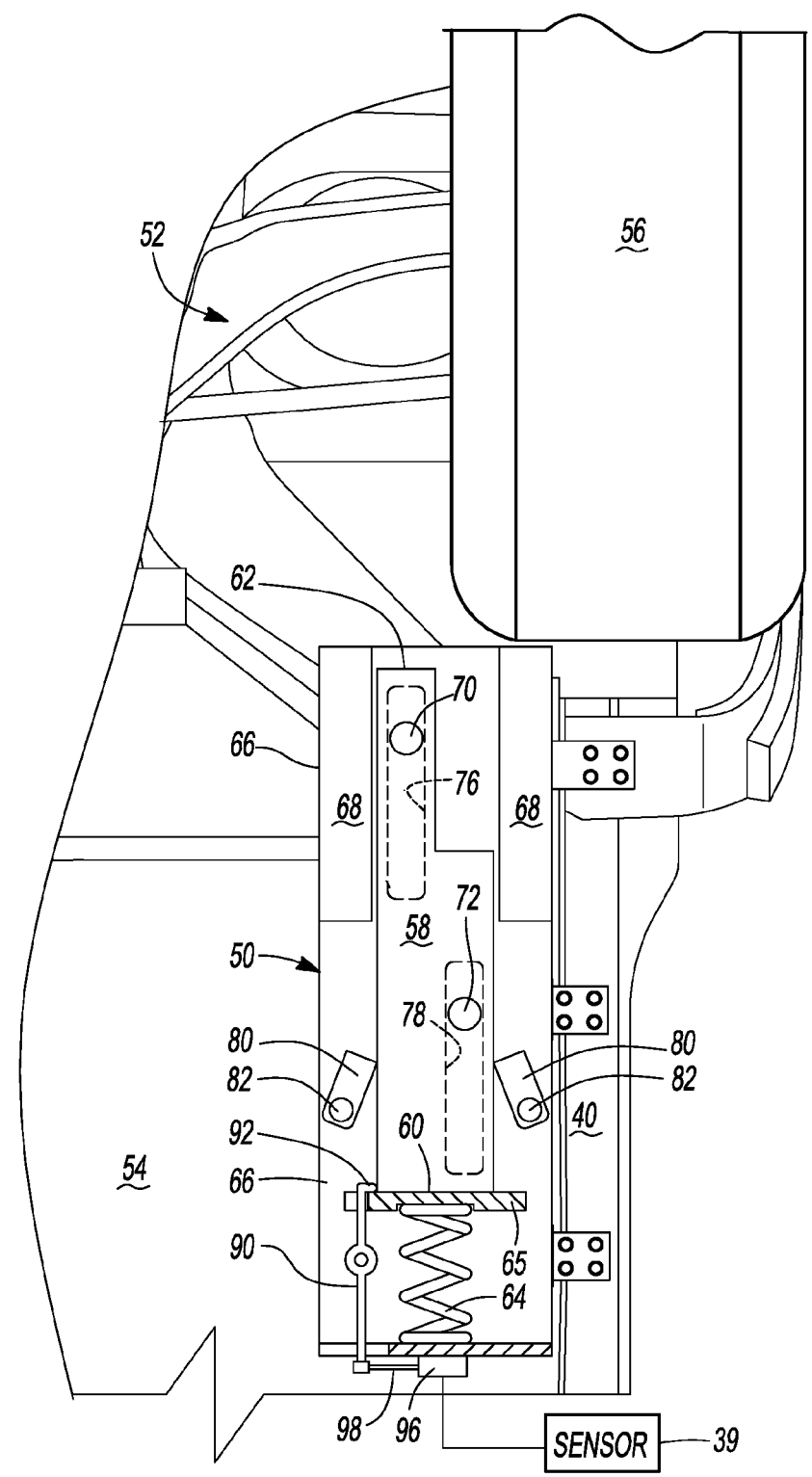
FIG. 4 is a fragmentary bottom plan view of an alternative embodiment of a tire rotation blocking apparatus in the ready position.
Figure 5:
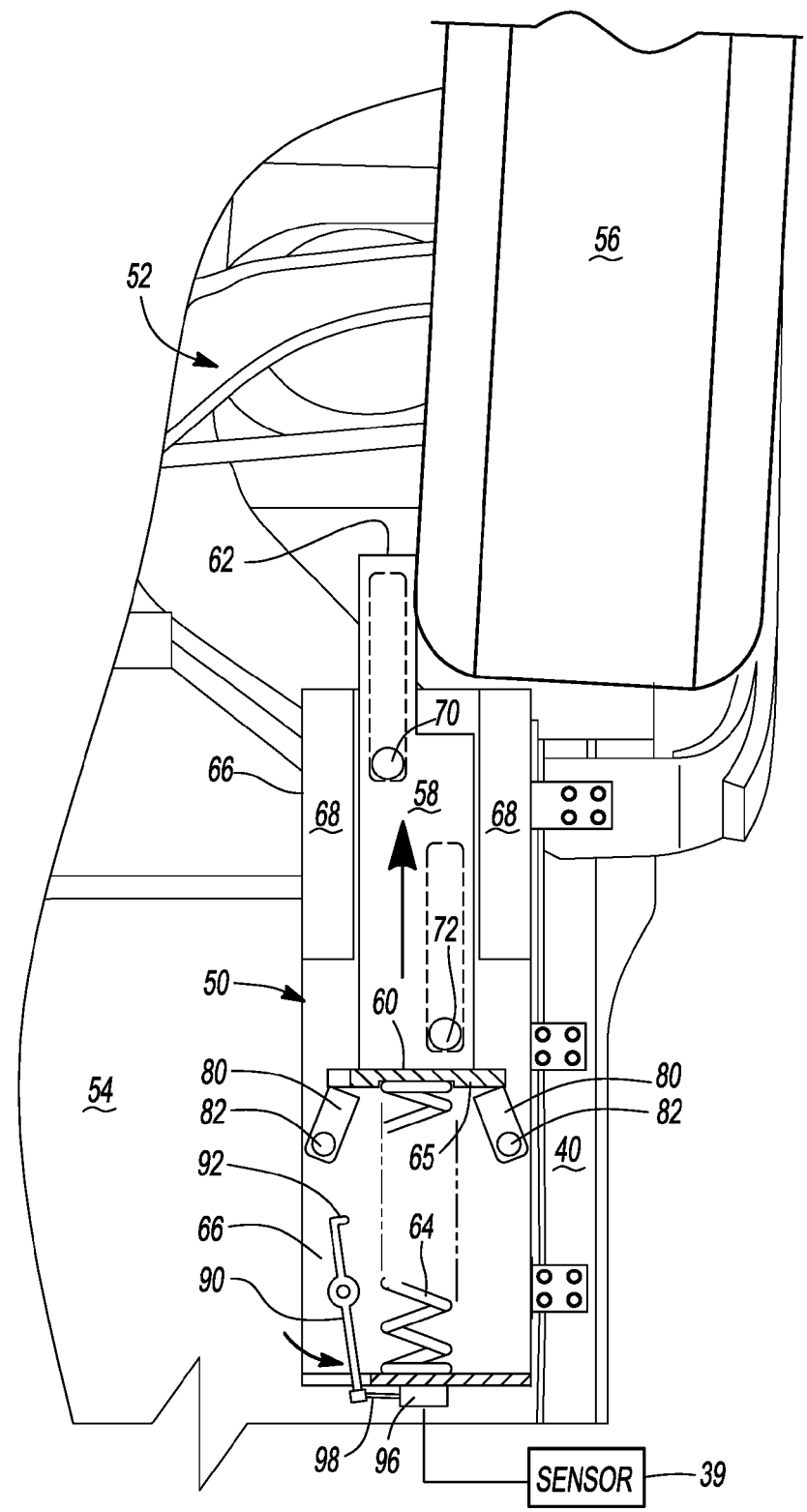
FIG. 5 is a fragmentary bottom plan view of the tire rotation blocking apparatus shown in FIG. 4 in the deployed position.

Referring to FIGS. 4 and 5, an alternative wheel rotation blocking apparatus 50 is shown to be attached to a vehicle 52. The vehicle 52 includes a passenger compartment 54. The vehicle 52 also includes a wheel assembly 56. A blocking bar 58 is assembled to the vehicle 52 with a back end 60 of the blocking bar 58 being disposed adjacent a rocker assembly 40 and a front end 62 of the blocking bar 58 being disposed in the ready position at a location spaced rearward of the wheel assembly 56. In the deployed position, as shown in FIG. 5, the front end 62 of the blocking bar 58 is disposed laterally inboard of and adjacent to the wheel assembly 56.

Referring to FIG. 4, the wheel rotation blocking apparatus 50 is shown with the blocking bar 58 is in the ready position. In FIG. 5, the blocking bar 58 is shown in the deployed position. A spring 64 is shown compressed in FIG. 4 and in contact with a backing plate 65 at the back end 60 of the blocking bar 58. A housing 66 contains the components of the blocking apparatus 50 and defines a pair of guide blocks 68 that guide the forward longitudinal movement of the blocking bar 58. A front pin 70 and rear pin 72 are provided on the housing 66 or are otherwise connected to the vehicle 52. A front slot pin guide 76 receives the front pin 70 and a rear slot pin guide 78 receives the rear pin 72.

Locking levers 80 are torsion spring loaded locking levers that are used to hold the blocking bar 58 in the deployed position. The locking levers 80 are connected to the housing by torsion spring loaded locks 82. The blocking bar 58 is driven by the spring 64 in the forward longitudinal vehicle direction upon impact. The locking levers 80 pivot to permit the blocking bar 58 to move forward past the locking levers 80. The spring loaded locks 82 prevent the blocking bar 58 from returning to the ready position and hold the blocking bar 58 in the deployed position after an impact.

As shown in FIG. 4, the wheel rotation blocking apparatus 50 is held in the ready position with the spring 64 compressed. A pivot link 90 having a retainer tab 92 engages the backing plate 65. The backing plate 65 is secured to the back end 60 of the blocking bar 58. The spring 64 biases the backing plate 65 against the retainer tab 92.

Referring to FIG. 5, the wheel rotation blocking apparatus 50 is shown in the deployed position with the spring 64 released and the blocking bar 58 engaging the wheel assembly 56. A solenoid 96, or other electronic actuator, receives a signal from a crash sensor (such as an accelerometer used to sense a collision and deploy an air bag) and is actuated to retract, or otherwise move, a link 98 that is connected to the pivot link 90. The link 98 pivots the pivot link 90 to release the backing plate 65 from the retainer tab 92. Releasing the backing plate 65 allows the blocking bar 58 to be driven forward to block the wheel assembly 56 from being driven into the passenger compartment 14.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An apparatus for preventing a wheel of a vehicle from moving toward a passenger compartment in a front-end collision, the apparatus comprising:
    an elongated bar;
    a plurality of guide members attached to the vehicle that guide movement of the bar in a longitudinal direction; and
    an actuator operatively connected to the bar that drives the bar in the longitudinal direction to a position between the wheel and the passenger compartment after the front-end collision, wherein the elongated bar is retained by the guide members and includes first and second longitudinally extending legs that are connected by a transversely extending leg, wherein a front portion of the first longitudinally extending leg is disposed inboard of the wheel after the actuator drives the bar longitudinally, and wherein the second longitudinally extending leg is laterally offset relative to the first longitudinally extending leg.

2. The apparatus of claim 1, wherein the actuator is a pyrotechnic actuator disposed at a back end of the bar that is actuated by a crash sensor in a collision to exert a force on the back end of the bar.

3. The apparatus of claim 1 further comprising:
    at least one stop provided on the bar that engages one of the guide members to hold the bar between the wheel and the passenger compartment.

4. The apparatus of claim 1, wherein at least one guide member receives the first longitudinally extending leg and at least one guide member receives the second longitudinally extending leg.

5. The apparatus of claim 4, wherein at least one of the guide members is attached to a rocker assembly of the vehicle.

6. The apparatus of claim 1, wherein the elongated bar is moved by the actuator between a ready position with a front end of the bar disposed rearward of the wheel and a deployed position with the front end of the bar disposed adjacent an inner side of the wheel.

7. An apparatus for protecting a passenger compartment of a vehicle from intrusion by a wheel in a front-end collision, the apparatus comprising:
 a blocker longitudinally movable between a ready position behind the wheel and a deployed position between the wheel and the passenger compartment; and
 an actuator fixed to the vehicle and operatively connected to the blocker to drive the blocker between the ready position and the deployed position in the front-end collision, wherein the blocker is retained by a guide member and includes first and second longitudinally extending legs that are connected by a transversely extending leg, wherein a front portion of the first longitudinally extending leg is disposed inboard of the wheel after the actuator drives the blocker longitudinally, and wherein the second longitudinally extending leg is laterally offset relative to the first longitudinally extending leg.

8. The apparatus of claim 7, wherein the actuator is a pyrotechnic actuator operatively connected to the blocker.

9. The apparatus of claim 8 further comprising:
 at least one stop provided on the blocker that engages a guide member to hold the blocker between the wheel and the passenger compartment.

10. The apparatus of claim 7, wherein at least one guide member receives the first longitudinally extending portion and at least one guide member receives the second longitudinally extending portion.

11. The apparatus of claim 10, wherein at least one of the guide members is attached to a rocker assembly of the vehicle.

12. The apparatus of claim 7, wherein the blocker is moved by the actuator between a ready position with a front end of the blocker disposed rearward of the wheel and a deployed position with the front end of the blocker disposed adjacent an inner side of the wheel.

13. An apparatus for blocking a wheel of a vehicle comprising:
 a wheel blocker including a first longitudinal leg laterally offset from and connected to a second longitudinal leg by a transverse leg;
 a guide retaining the blocker; and
 an actuator operatively connected to the blocker to longitudinally drive the blocker from a ready position to a deployed position, wherein the first leg is disposed inboard of the wheel in a collision.

14. The apparatus of claim 13 further comprising:
 a stop attached to the guide that retains the wheel blocker in the deployed position after the actuator drives the wheel blocker to the deployed position in the collision.

* * * * *